No. 786,609. PATENTED APR. 4, 1905.
L. P. STEELE.
MEASURE.
APPLICATION FILED JUNE 24, 1903. RENEWED JAN. 23, 1905.

Witnesses:

Inventor
Leslie P. Steele,
By N. C. Evert & Co.
Attorneys

No. 786,609.

Patented April 4, 1905.

UNITED STATES PATENT OFFICE.

LESLIE P. STEELE, OF WASHINGTON, PENNSYLVANIA.

MEASURE.

SPECIFICATION forming part of Letters Patent No. 786,609, dated April 4, 1905.

Application filed June 24, 1903. Renewed January 23, 1905. Serial No. 242,301.

*To all whom it may concern:*

Be it known that I, LESLIE P. STEELE, a citizen of the United States of America, residing at Washington, in the county of Washington and State of Pennsylvania, have invented certain new and useful Improvements in Measures, of which the following is a specification, reference being had therein to the accompanying drawings.

This invention relates to certain new and useful improvements in measures, and more particularly to that class which are adjustable, whereby any desired quantity may be measured.

The object of my invention is to provide an adjustable measure which will be extremely simple, strong, and durable, comparatively inexpensive to manufacture, and highly efficient to the usages to which it is applied.

Another object of my invention is to provide a measure having an adjustable bottom, means being provided upon the sides of the measure whereby the bottom may be raised or lowered to any desired position and rigidly held there until the same is again to be moved.

Briefly described, my improved measure comprises an annular casing having a movable bottom or base, graduated slots being provided in the sides of said casing whereby the bottom of the measure may be raised or lowered to any desired position, means being provided in connection with said bottom for locking the same in either one of the graduated positions.

In describing the invention in detail reference is had to the accompanying drawings, forming a part of this specification, and wherein like numerals of reference indicate like parts throughout the several views, in which—

Figure 1:
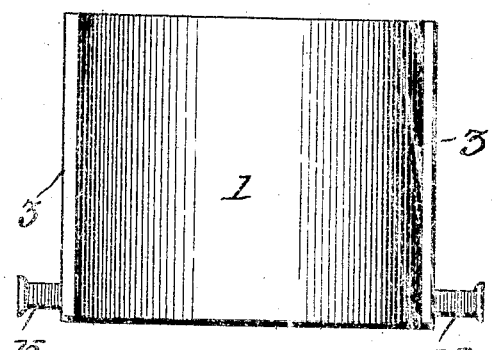
Figure 2:
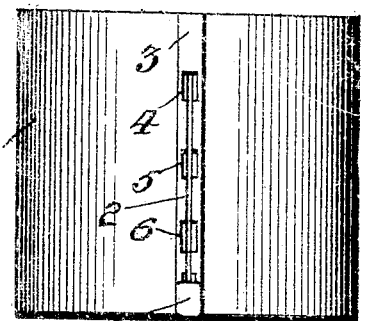
Figure 3:
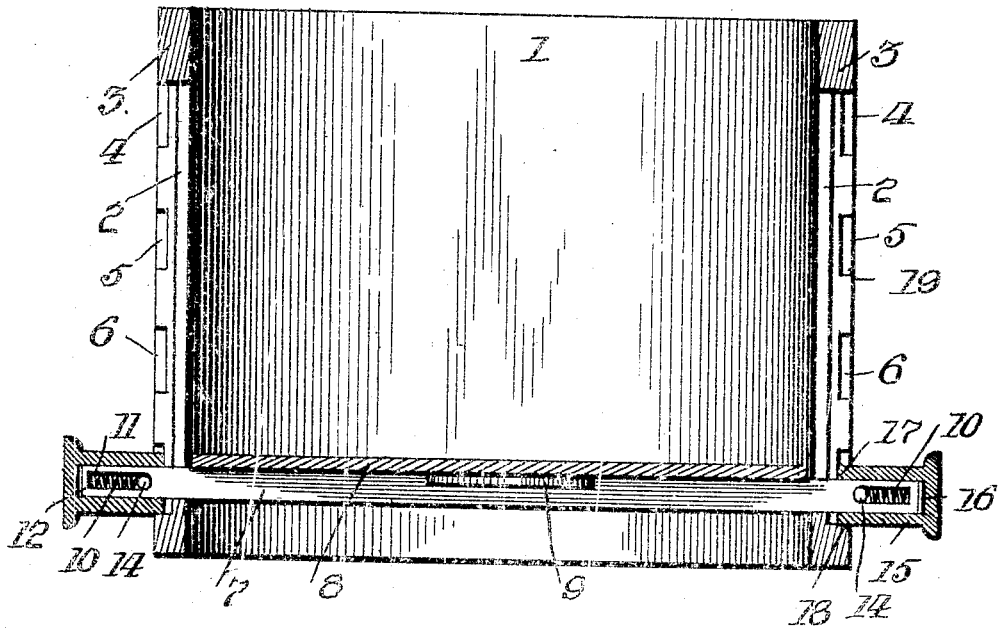

Figure 1 is a side elevation of my improved measure. Fig. 2 is a front view thereof. Fig. 3 is a vertical sectional view of the measure.

In the accompanying drawings I have illustrated my improved measure as comprising an annular shell or casing 1, and in the sides of said shell are formed the slots 2. These slots are formed in an enlarged portion 3, said portions being formed integral with the shell 1 and diametrically opposite each other. In these enlarged portions I form the auxiliary slots 4, 5, and 6, and in the slot 2 of the shell I mount the operating-lever 7, which supports the base or bottom of the measure, a further support 9 being provided upon the lever 7 to support the bottom of the measure. The ends of the lever 7 extend outwardly through the slots 2 and have elongated slots 10 formed in their ends, in which are mounted the springs 11, the one end of said spring adapted to rest against the end 12 of the lever 7, while the other end of the spring is adapted to be engaged by a pin 14, carried by the operating knob or handle 15. This knob or handle is supported upon the lever 7 by means of the pin 14 and the slot 16, which is adapted to receive the ends of the lever 7, and while I have herein shown this form of handle it is obvious I may employ similar knobs or handles in which the ends of the lever and the spring may be inserted.

The operation of my improved measure is as follows: I will assume that the measure has been graduated and made of such a size as to represent a bushel-measure and it being desired to measure a half-bushel, the knobs or handles 16 are pulled outwardly until the ends 17 of the knobs or handles become disengaged from the slot in which it is seated, when the handles or knobs are moved upwardly until the slot 5 has been reached, when the handles or knobs are slightly released, allowing the ends 17 of the knobs to again be seated in the auxiliary slot 5. When the bottom or base of the measure is in this position, the same is supported by the lower edge 18 of the knobs resting upon the edges 19 of these auxiliary slots, and if any smaller quantity is desired the base or bottom of the measure may be shifted to any one of the notches which represent the half and quarters of a bushel, or a plurality of these auxiliary slots may be provided, whereby smaller quantities may be measured. It will also be noted that my improved measure may be graduated to pounds, if it is desired, and other slight changes may be made without varying from the general spirit and scope of the invention.

Having fully described my invention, what

I claim as new, and desire to secure by Letters Patent, is—

1. A measure comprising an annular shell having an adjustable base, enlarged portions formed on the sides of said shell, a slot formed in said enlarged portion, auxiliary slots formed upon each side of said slots, a lever projecting through said slots and supporting the base, handles carried by the ends of said lever, means carried by said lever for holding the handles in engagement with the last-named slots, substantially as described.

2. A measure comprising an annular shell having an adjustable base, enlarged portions formed on the sides of said shell, a slot formed in said enlarged portion, auxiliary slots formed upon each side of said slots, a lever projecting through said slots and supporting the base, handles carried by the ends of said lever, elongated slots formed in the ends of said lever, a pin mounted within said slots, a spring mounted within said slots, said spring adapted to normally hold the handle in engagement with the last-named slots, substantially as described.

In testimony whereof I affix my signature in the presence of two witnesses.

LESLIE P. STEELE.

Witnesses:
F. D. McGEE,
JAMES A. MAGILL.